United States Patent [19]

Davis et al.

[11] Patent Number: 4,790,513
[45] Date of Patent: Dec. 13, 1988

[54] SOLENOID VALVE ASSEMBLY

[75] Inventors: Ronald G. Davis; David S. Dennis; James S. Hickman, all of Anderson; William J. Linch, Knightstown, all of Ind.

[73] Assignee: General Motors Corporation, Detroit, Mich.

[21] Appl. No.: 751,875

[22] Filed: Jul. 5, 1985

Related U.S. Application Data

[63] Continuation of Ser. No. 552,829, Nov. 17, 1983, abandoned.

[51] Int. Cl.$^4$ ............................................. F16K 31/02
[52] U.S. Cl. ............................ 251/129.21; 251/129.06; 137/625.65
[58] Field of Search .................... 251/129.01, 129.02, 251/129.06, 129.08, 129.15, 129.21, 333, 359; 137/625.65; 335/279

[56] References Cited

U.S. PATENT DOCUMENTS

| | | | |
|---|---|---|---|
| 3,446,246 | 5/1969 | Huley | 137/625.65 |
| 3,735,302 | 5/1973 | Eckert | 335/279 |
| 4,102,526 | 7/1978 | Hargraves | 137/625.65 |
| 4,442,864 | 4/1984 | Kosugi | 137/625.65 |

Primary Examiner—Samuel Scott
Assistant Examiner—Noah Kamen
Attorney, Agent, or Firm—Donald F. Scherer

[57] ABSTRACT

A solenoid valve assembly has a slidable valve member which responds to a selectively energizable solenoid coil and a spring to control the opening and closing of pressure and exhaust ports through movement of the valve member. When the pressure port is fully opened, the valve member is seated against a solenoid stop and port member. The solenoid stop and port member includes a central flow passage which serves as the exhaust passage for the valve assembly. The flow passage is surrounded by a valve seat area which includes a frusto-conical surface having a recess or groove formed therein. The frusto-conical surface and the groove therein reduces the flow forces imposed on the valve member which generally operate to assist seating of the valve member. By reducing the flow forces, the unseating force necessary to open the exhaust port is reduced resulting in lower spring and magnetic forces.

4 Claims, 1 Drawing Sheet

SOLENOID VALVE ASSEMBLY

This invention is a continuation of U.S. Ser. No. 552,829, filed Nov. 17, 1983, now abandoned.

This invention relates to valve assemblies and more particularly to solenoid controlled valve assemblies.

It is an object of this invention to provide an improved solenoid valve assembly wherein a valve plunger is urged against a port and stop member having a central exhaust flow passage which is surrounded by a valve seat including a frusto-conical portion, an annular recess adjacent the radial outer edge of the frusto-conical portion and a frusto-conical surface diverging from the radially outer edge of the annular recess.

It is another object of this invention to provide an improved solenoid valve assembly having a solenoid and spring controlled valve plunger including a flat end surface adapted to seat against a port and stop member which includes a centrally disposed exhaust passage surrounded by a frusto-conical surface diverging from the flat surface and being interrupted in a radial direction by an annular groove of V-shaped cross section.

These and other objects and advantages of the present invention will be more apparent from the following description and drawings in which.

Figure 1:
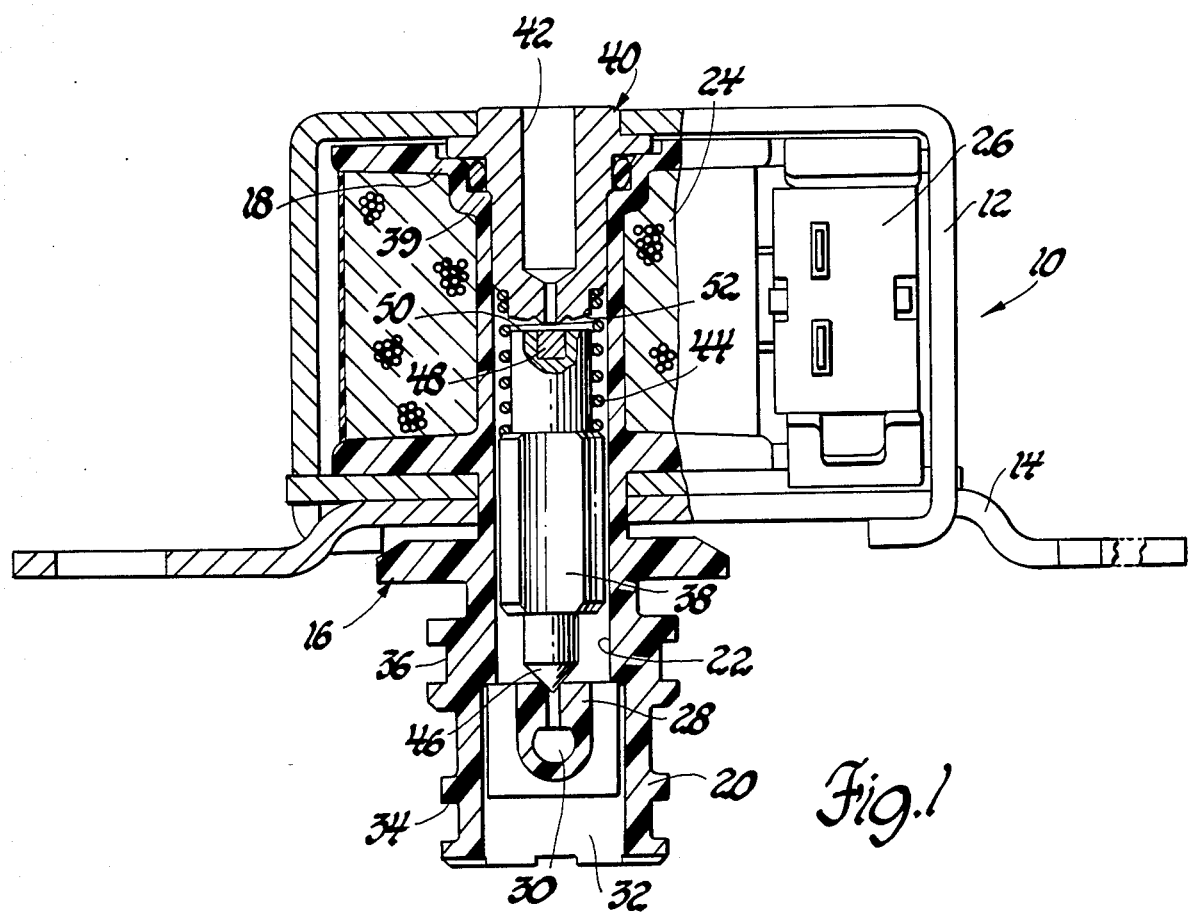
FIG. 1 is a cross-sectional elevational view of a valve assembly incorporating the present invention.

Referring to the drawings, wherein like characters represent the same or corresponding parts throughout the several views, there is seen in FIG. 1 a solenoid valve assembly 10 which includes a metal housing 12 secured to a mounting bracket 14. The housing 12 has disposed therein a valve body 16 composed of nonmetallic material such as plastic. The valve body 16 has a reel portion 18, a fluid port portion 20 and a central bore 22. The reel portion 18 is surrounded by a solenoid coil 24 which is adapted to be connected to an electrical control circuit, not shown, through an electrical fitting 26.

The fluid port portion 20 includes an integrally formed pressure inlet portion 28 having a pressure passage 30 and a control passage 32. The outer surface of the fluid port portion 20 is grooved at 34 and 36 to support ring seals, not shown, for use when the solenoid valve 10 is secured in a valve block for a hydraulic control system in a well known manner. The high pressure port 30 is open to the external area of the fluid port portion 20 between the grooves 34 and 36.

The valve bore 22 has disposed therein a slidable valve plunger 38. The end 39 of valve bore 22 is closed by an exhaust port and solenoid stop member 40. The stop member 40 is maintained in the valve bore 22 by housing 12. The stop member 40 has a central stepped diameter passage 42 which serves as the exhaust port or exhaust flow passage for the solenoid valve 10.

As seen in FIG. 1, the valve plunger 38 is disposed between the stop member 40 and the pressure inlet portion 28. The plunger 38 is urged toward the inlet portion 28 by a spring 44. The plunger 38 has a pointed end 46 which closes the passage 30, when urged into abutment with the inlet portion 28 by the spring 44 to close the inlet passage 30 from the control passage 32. The stop member 40 and the plunger 38 are formed from magnetic metals such that when the solenoid coil 24 is energized, the plunger 38 will move toward the stop member 40 depending upon the power supplied to the solenoid coil 24 and the strength of spring 44 as is well known.

To prevent magnetic lock-up between the plunger 38 and the stop 40, a nonmagnetic insert 48 is disposed in the plunger 38. The insert 48 is preferably made of stainless steel. The end 50 of plunger 38 which is adapted to seat on the stop member 40 is a flat surface.

Figure 2:
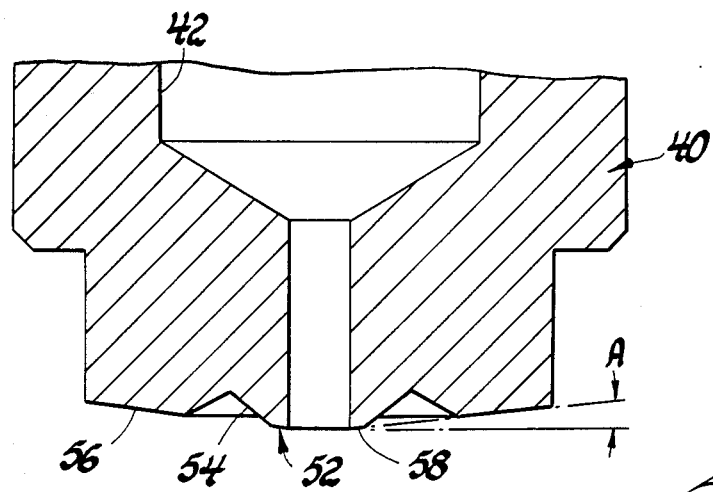
FIG. 2 is an enlarged view of a portion of FIG. 1.
Figure 3:
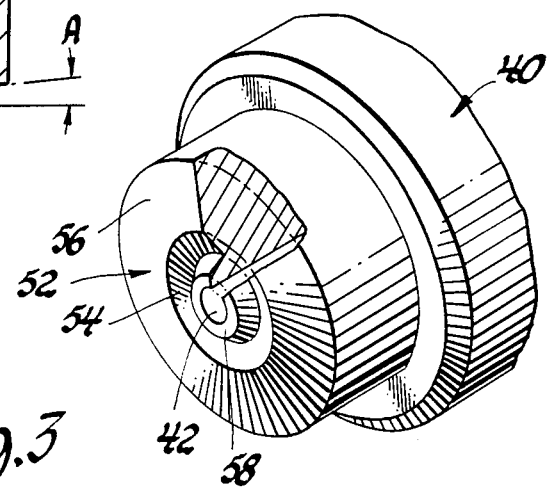
FIG. 3 is a perspective view of a component of the valve assembly.

As seen in FIGS. 1 and 2, the smaller diameter portion of the flow passage 42 extends through the end surface 52 of stop member 40 adjacent the flat surface 50 of plunger 38. The end surface 52 of stop 40 is generally frusto-conical in shape such that it diverges from the flat surface 50 as it extends radially outward from the flow passage 42. The frusto-conical surface of end surface 52 is interrupted by a groove or recess 54 which, as is best seen in FIG. 2, is V-shaped in cross section. The frusto-conical surface therefore is divided essentially into two portions; an outer surface 56 and an inner surface 58. The inner surface 58 extends from the outer edge of passage 42 to the inner edge of groove 54 while the outer frusto-conical surface 56 extends from the outer edge of recess 54. The only valve seat area available for the flat surface 50 of the plunger 38 to seal against is essentially a line surface at the intersection of passage 42 and surface 58.

As the flat surface 50 seats against the stop member 40, the flow forces which generally accompany the abutment of two flat surfaces is reduced considerably due to the presence of groove 54 and the frusto-conical shape of surface 52. This structure reduces the flow forces such that the force in spring 44 is much less than the force required in conventional valves. Since the force in spring 44 is reduced, the power consumption and/or size of the solenoid 24 is also reduced. Thus, the valve exhibits higher efficiency than conventional valves.

While the recess 54 is shown as having a V-shaped cross section, other shapes of grooves are viable. However, the V-shaped cross section has been found to be the most easily producible.

This valve structure has been found to work equally well in both on/off type solenoid valves and in proportional control or duty cycle controlled solenoid valves.

The following dimensions have been found to be acceptable in a transmission control valve having a pressure range of 0 to 250 psi when controlled by a voltage source of 11–15 volts.

| Diameter of Passage 42 | .7–.8 mm |
| --- | --- |
| Angle A | 7° |
| Outer Diameter of 58 | 1.2–1.3 mm |
| Inner Diameter of 56 | 2.5–2.6 mm |
| Outer Diameter of 56 | 5.1–5.3 mm |

Obviously, many modifications and variations of the present invention are possible in light of the above teaching. It is therefore to be understood that within the scope of the appended claims, the invention may be practiced otherwise than as specifically described.

The embodiments of the invention in which an exclusive property or privilege is claimed are defined as follows:

1. A solenoid valve comprising a valve body; a bore in said valve body; a fluid port in said valve body comprising a central flow passage; a valve seat area surrounding said flow passage including a frusto-conical surface portion diverging from said central flow passage, an annular recess having a V-shaped cross section with the radially inner edge thereof terminating at the radially outer edge of said valve seat area, and a frusto-conical surface diverging from the radially outer edge of said annular recess; a valve member slidably disposed in said bore and having a flat end surface adapted to seat on said valve seat area only at the linear intersection of the control passage and the frusto-conical surface to prevent contact between said valve member and said frusto-conical surface; spring means for urging said valve member off said valve seat area; and selectively energizable solenoid coil means surrounding a portion of said valve member for forcing said valve member into abutment with said valve seat area to close said fluid port.

2. A solenoid valve comprising a valve body; a bore in said valve body; a fluid port in said valve body comprising a central flow passage, a frusto-conical surface portion diverging from said central flow passage, a valve seat formed at the intersection of said frusto-conical surface portion and said central flow passage, an annular recess formed in the fluid port with a radially inner edge thereof terminating at the radially outer edge of said frusto-conical surface portion of said valve seat, and a frusto-conical surface diverging from the radially outer edge of said annular recess; a valve member slidably disposed in said bore and having a flat end surface adapted to seat on said valve seat; spring means for urging said valve member off said valve seat; and selectively energizable solenoid coil means surrounding a portion of said valve member for forcing said valve member into abutment with said valve seat to close said fluid port.

3. A solenoid valve comprising a valve body; a bore in said valve body; a fluid port in said valve body comprising a central flow passage, a frusto-conical surface having an inner diameter diverging from said central flow passage and an outer diameter, an annular recess of V-shaped cross section interrupting said frusto-conical surface intermediate the inner and outer diameters thereof; a valve member slidably disposed in said bore and having a flat end surface adapted to seat at the intersection of said central flow passage and said frusto-conical surface whereby contact between said valve member and said frusto-conical surface is prevented; spring means for urging said valve member away from said central flow passage; and selectively energizable solenoid coil means surrounding a portion of said valve member for forcing said valve member in a direction to close said fluid port.

4. A solenoid valve comprising a valve body; a bore in said valve body; a fluid port in said valve body comprising a central flow passage, a first frusto-conical surface portion diverging from said central flow passage, a line contact valve seat formed at the intersection of said frusto-conical surface and said central passage, an annular recess formed in the fluid port with a radially inner edge thereof terminating at the radially outer edge of said frusto-conical surface portion of said valve seat, and a second frusto-conical surface portion diverging from the radially outer edge of said annular recess; a valve member slidably disposed in said bore and having a flat end surface including a central nonmagnetic portion adapted to seat on said valve seat; spring means for urging said valve member off said valve seat; and selectively energizable solenoid coil means surrounding a portion of said valve member for forcing said valve member into abutment with said valve seat to close said fluid port, said second frusto-conical surface portion and said flat end surface cooperating to provide a first gradually reducing fluid flow space during seating of said valve member on said line contact valve seat, said first frusto-conical surface portion and said nonmagnetic portion cooperating to provide a second gradually reducing fluid flow space during seating of said valve member on said line contact valve seat, said annular recess providing a discontinuance of said first gradually reducing flow space, and said gradually reducing flow spaces, said annular recess and said line contact valve seat cooperating to reduce the required solenoid coil size for a given spring means.

* * * * *